Sept. 18, 1956 P. H. TAYLOR 2,763,177

SOLAR AND STELLAR TRACKER

Filed Oct. 24, 1952

INVENTOR:
Philip H. Taylor

By Herbert E. Metcalf
His Patent Attorney

United States Patent Office 2,763,177
Patented Sept. 18, 1956

2,763,177

SOLAR AND STELLAR TRACKER

Philip H. Taylor, Santa Ana, Calif., assignor to Northrop Aircraft, Inc., Hawthorne, Calif., a corporation of California Application October 24, 1952, Serial No. 316,583

6 Claims. (Cl. 88—1)

This invention relates to astronomical tracking devices, and more particularly, to an astronomical tracking device suitable for use with either solar or stellar light sources.

Owing to the difference in magnitudes, a stellar tracker must be naturally much more sensitive to light intensity than a solar tracker, so much so that an optical system suitable for one is not suitable for the other. The present invention deals with a device capable of effecting conversion from stellar to solar tracking or vice versa by utilization of an arrangement of optical elements which effectively controls light intensity to a value suitable for each use.

It is, accordingly, an object of this invention to provide a versatile tracking means capable of tracking either the (daytime system) sun or prominent stars (nighttime system).

It is another object of this invention to provide means for the accurate reduction of light intensity to a predetermined or to a desired magnitude.

Broadly, the invention consists of a train of optical elements useable in one arrangement to provide high light transmission, together with means for rearranging the same elements to provide a much lower light transmission.

Previously enumerated objects and features will be more fully understood and other objects will be rendered apparent by reference to the following detailed description viewed in conjunction with the accompanying drawings wherein.

Figure 1:
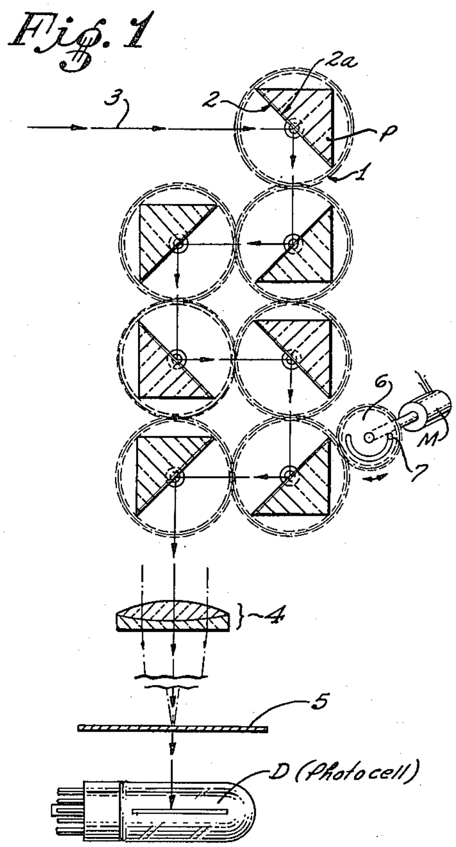
Figure 1 is a simplified diagram of a preferred embodiment of the invention in use as a solar scanning device.

Referring first to Figure 1, showing the arrangement used for sun tracking, it can be noted that there are a plurality of prisms P and that each right-angle prism P is mounted on a ring gear 1; these gears are inter-meshed with one another as indicated on the diagram. A light attenuating coating 2 of a fluoride, for example, is applied to the hypotenuse surface face 2*a* of each right-angle prism P. An incident light ray from the sun is indicated by dotted line 3, such a light ray is attenuated by the coatings on a multiplicity of prisms P and is ultimately focused by lens 4 onto scanning disc or chopper 5.

A photo-sensitive device D is placed under scanning disc 5. Light ray 3 from the sun is substantially attenuated each time it is reflected by the external surface 2*a* of the prism through coating 2; finally, the intensity of the image of the sun reaching scanning disc 4 is only that of a first magnitude star.

Figure 2:
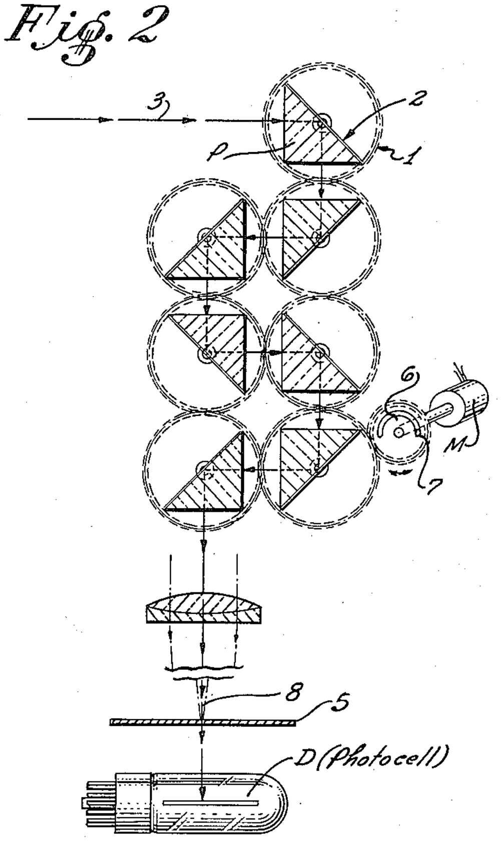
Figure 2 is a simplified diagram of a preferred embodiment of the invention in use as a stellar scanning device.
Figure 3:
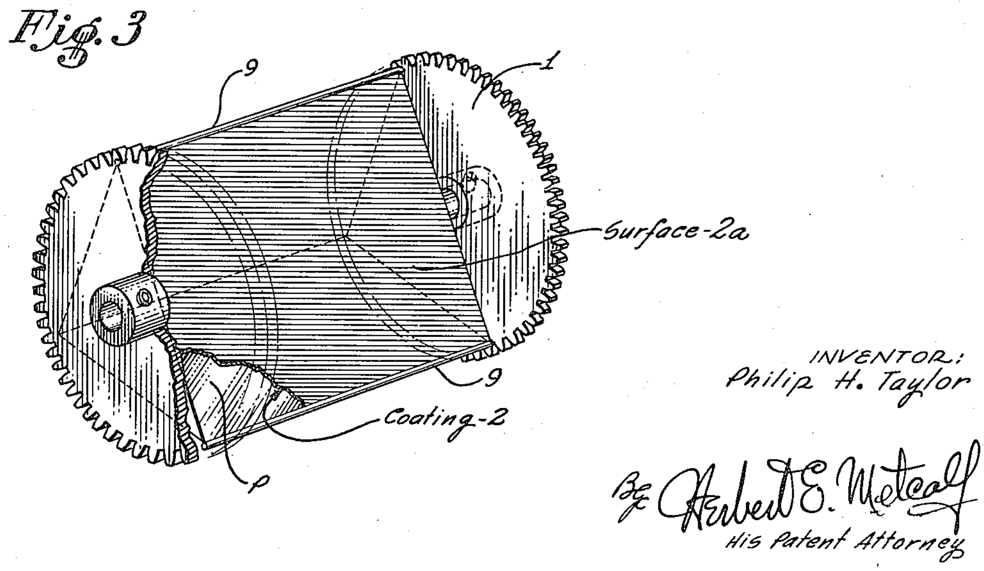
Figure 3 is a perspective diagram showing how a typical prism is mounted in the device shown in Figures 1 and 2.

Rotation of drive gear 6 by motor M for example, effects conversion of the solar scanning system illustrated in Figure 1 to a stellar scanning system, by a 180° rotation of prisms P. Figure 2 is a diagrammatic representation of the resulting stellar scanning system. It is to be noted that light ray 3 is not now drastically attenuated as was the case illustrated in Figure 1 because the light is not attenuated by coatings 2 but is internally reflected from surfaces 2*a* of all prisms. High light sensitivity is thus provided.

Drive gear 6 can be arranged to contact any one of ring gears 1 so long as 180° rotation is effected, and in that case a pin stop 7 is utilized in order to limit the rotation of a prism P to the required 180°.

It is to be noted that only one prism P need be used to attenuate the sun's intensity providing the coating on face 2*a* is of suitable density.

It should also be noted that the multiple prisms P can be driven individually in order to effect a consecutive turning motion i. e. one prism after another is turned until a desired light intensity is attained. Thus a serial type driving means will provide a gradual reduction in light intensity. Of course, under these conditions ring gears 1 would not be directly meshed as they were in the foregoing description.

In summary, the prism arrangement shown in Figure 1 is for solar scanning; rotation of drive gear 6 effects a 180° rotation in all prisms, and consequently establishes the much more sensitive night star tracking apparatus (stellar scanner) as is illustrated in Figure 2.

Unimportant structural details of this invention have been omitted for the purpose of more clearly emphasizing that structure which is regarded as novel; such structural details may be readily supplied by persons skilled in the art; therefore the invention, as disclosed, represents a basic structure for purposes of illustration and the invention is claimed in any of its forms or modifications which are encompassed by the legitimate and valid scope of the appended claims.

I claim:

1. In a light-sensitive tracking device, the combination comprising: a train of prisms, a reflecting face of each of said prisms being coated with a light attenuating material, gears connected to each of said prisms, said gears being intermeshed, a drive gear mounted against one of said gears, said drive gear being capable of effecting rotation of each of said prisms between first and second positions whereby light in passing through said train passes through said coating and is reflected externally of said prisms when the latter are in said first position and is reflected internally of said prisms in passing through said train without passing through said coatings when said prisms are in said second position.

2. Apparatus as set forth in claim 1, further characterized in that each of said prisms is a right angle prism and in which said coated face is opposite the right angle of said prism.

3. In an optical system the major component parts of which are orientable between two positions so that light from a weak and a strong source are transmitted to light receiving means at approximately the same intensity at such times as said component parts are in either of said positions, comprising: a plurality of prisms arranged in spaced relation in two vertical columns; a coating of light attenuating material on a single light reflecting face of each of said prisms; and means for rotating said prisms between a first position, in which light from said strong source in being transmitted to said light receiving means traverses a course passing through each of said coatings two times and in which said course is located externally of said prisms, and a second position, in which light from said weak source is reflected before passing through said coatings and traverses a course located partially internally of said prisms in being transmitted to said light receiving means.

4. Apparatus as set forth in claim 3, further characterized in that each of said prisms is a right-angle prism and said light reflecting faces constitute the hypotenuse side of said prisms.

5. Apparatus as set forth in claim 4, in that said means for rotating said prisms between said first and second positions is a geared drive which effects 180° rotation of said prisms.

6. Apparatus as set forth in claim 5, further characterized in that said light reflecting faces have a parallel relationship at such times as said prisms are in said first and second positions and maintain said parallel relationship while being moved between said first and second positions.

References Cited in the file of this patent

UNITED STATES PATENTS

| | | |
|---|---|---|
| 1,755,740 | Linn et al. | Apr. 22, 1930 |
| 1,889,151 | Pechan et al. | Nov. 29, 1932 |
| 2,039,878 | Boykow | May 5, 1936 |
| 2,399,676 | Holschuh et al. | May 7, 1946 |
| 2,449,287 | Flood | Sept. 14, 1948 |
| 2,462,925 | Varian | Mar. 1, 1949 |
| 2,513,367 | Scott | July 4, 1950 |
| 2,588,792 | Barkley | Mar. 11, 1952 |

FOREIGN PATENTS

| | | |
|---|---|---|
| 299,064 | Germany | June 29, 1921 |
| 33,746 | Netherlands | Oct. 15, 1934 |